Jan. 4, 1938.  W. J. SPENGLER  2,104,140
MAGNETO GENERATOR
Filed Nov. 29, 1935  3 Sheets-Sheet 1

INVENTOR.
BY Walter J. Spengler
Clinton S. Janes
ATTORNEY.

Witness:
Burr W. Jones

Jan. 4, 1938.  W. J. SPENGLER  2,104,140
MAGNETO GENERATOR
Filed Nov. 29, 1935  3 Sheets-Sheet 2

Witness:
Burr W. Jones

INVENTOR.
BY Walter J. Spengler
Clinton S. Janes
ATTORNEY.

Jan. 4, 1938. W. J. SPENGLER 2,104,140
MAGNETO GENERATOR
Filed Nov. 29, 1935. 3 Sheets-Sheet 3

Witness:
Burr W. Jones

INVENTOR.
BY Walter J. Spengler
Clinton S. Janes
ATTORNEY.

Patented Jan. 4, 1938

2,104,140

UNITED STATES PATENT OFFICE 2,104,140

MAGNETO GENERATOR

Walter J. Spengler, Sidney, N. Y., assignor to Bendix Aviation Corporation, South Bend, Ind., a corporation of Delaware Application November 29, 1935, Serial No. 52,219

14 Claims. (Cl. 171—252)

The present invention relates to magneto generators and more particularly to high tension generators of the type used for ignition of internal combustion engines.

It is an object of the present invention to provide a novel magneto generator which is highly efficient and reliable in operation over long periods of use.

It is a further object to provide such a device in which a separate oil-tight housing is provided for the gearing which operates the distributor rotor.

It is another object to provide such a device embodying a novel casing structure which completely shields the magneto to prevent interference with radio signals, but which may be readily taken apart to permit disassembly of the magneto.

It is a further object to provide such a device in which an integral distributor and terminal block is housed in a section of the casing which may be removed and replaced as a unit.

It is another object to provide such a device in which the parts of the shielding casing so interfit and wedge together that retention of one part thereof serves to unify the entire assembly.

Further objects and advantages will be apparent from the following description taken in connection with the accompanying drawings in which.

Figures 2, 3:
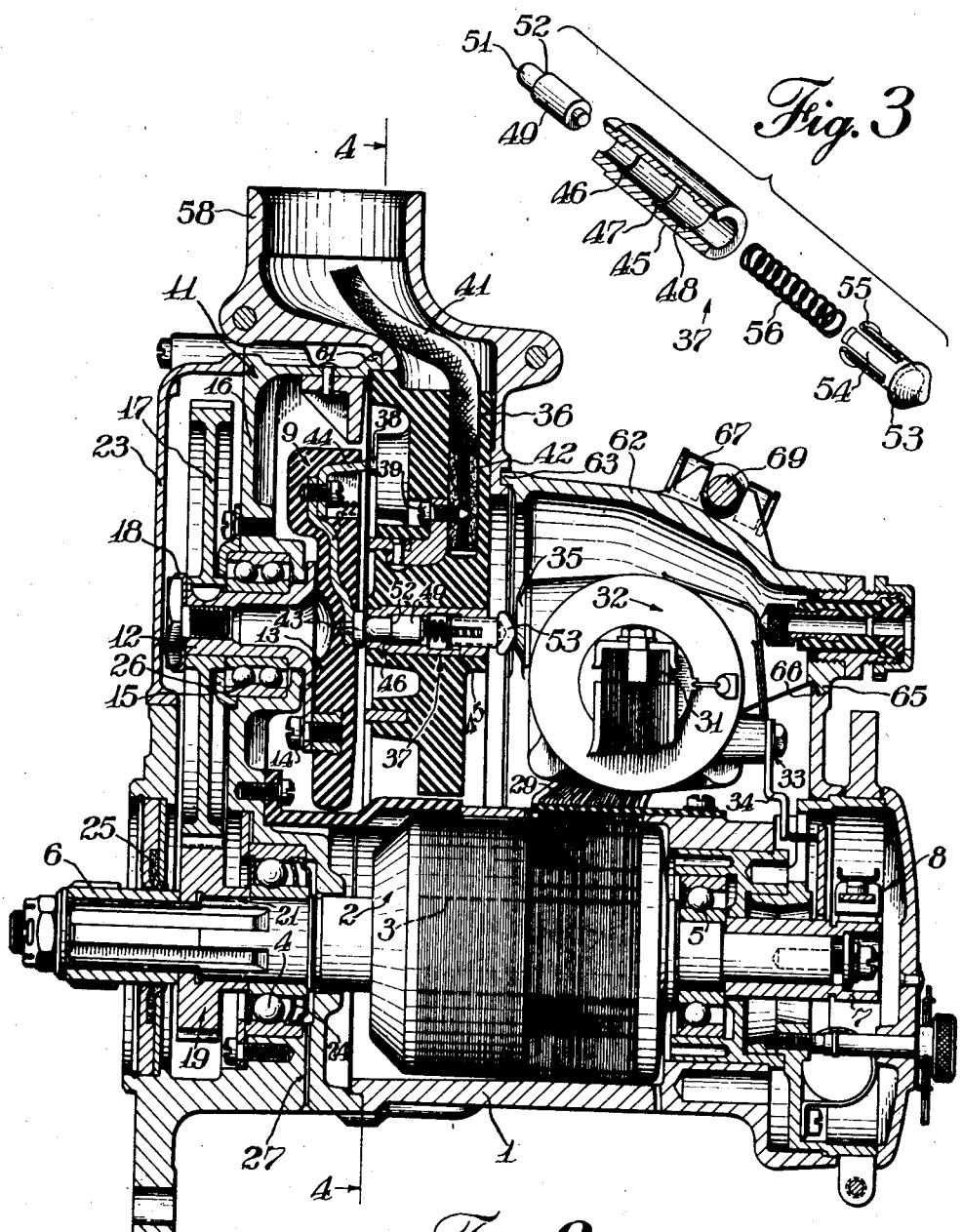
Fig. 2 is a vertical substantially midsectional view of such a magneto with the cable outlet arranged vertically.
Fig. 3 is a detail showing the parts of the compressible conducting means for connecting the output terminal of the coil to the rotor arm of the distributor.

Referring first to Fig. 2 of the drawings, there is illustrated a magneto comprising a frame 1 of non-magnetic metal such as an aluminum alloy. A rotor 2 comprising permanent magnetic elements 3 is suitably journalled in the casing 1 as by means of bearings 4 and 5 and carries at one end a splined sleeve 6 projecting from the casing to receive a coupling element for driving the rotor. Said rotor is provided at its other end with a cam element 7 adapted to operate a breaker mechanism indicated generally by numeral 8.

A distributor rotor 9 is journalled in an upwardly extending portion 11 of the frame 1 in parallel relation with the rotor 2. As here shown, this is accomplished by means of a stub shaft 12 having a flange 13 suitably attached to the rotor as indicated at 14, and formed to receive a bearing 15 mounted in a partition wall 16 of the frame section 11.

A gear 17 is suitably fixed on the end of stub shaft 12 as indicated at 18, and is arranged to mesh with a gear 19 keyed to the rotor 2 as shown at 21 and retained thereon by the sleeve 6. The arm 22 of the distributor rotor 9 is thus caused to rotate in timed relation with the magnetic rotor 2.

An oil-tight cover 23 is provided for completing a closed chamber for the gears 17, 19, and this chamber is rendered oil-tight by suitable packing means 24 and 25 for the bearing 4 and splined sleeve 6 respectively, and sealing element 26 for the bearing 15 of stub shaft 12. A drain 27 is preferably provided in the frame 1 to carry off any lubricant which might seep through the packing 24.

The frame 1 has formed therein magnetic pole pieces 28 cooperating with the poles 3 of the magnetic rotor, and the pole pieces 28 are connected in a closed magnetic circuit by means of suitable laminated magnetic material 29 and the core 31 of an induction coil 32. The ungrounded primary terminal 33 of the coil is connected by a conductor 34 to the breaker mechanism 8, the ungrounded end of the secondary of the coil being brought out to an output terminal 35.

Figure 4:
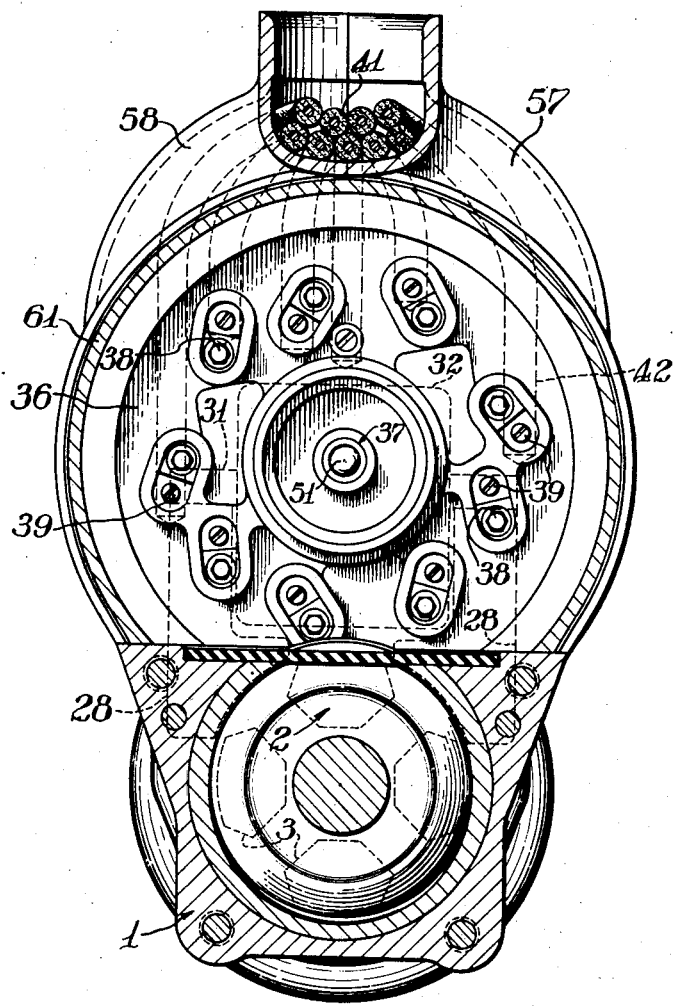
Fig. 4 is a vertical section taken substantially on the line 4—4 of Fig. 2.

According to the present invention, a generally circular distributor block and terminal member 36 is mounted between the coil 32 and the distributor rotor 9. This block is provided with a centrally arranged compressible conducting means indicated generally at 37 traversing the block axially, and a circumferential series of contacts 38 (Fig. 4). Contacts 38 are provided with connecting and anchoring means 39 for output cables 41 arranged to enter openings 42 in the distributor block. The distributor rotor is provided with an arm 22 having a central contact element 43 cooperating with one end of the conducting means 37, and a radial contact element 44 arranged to cooperate in sequence with contacts 38 of the distributor block.

In order that the distributor block may be removed and assembled conveniently by vertical movement thereof between the distributor rotor 9 and the coil 32, the conducting means 37 is made compressible as best shown in Figs. 2 and 3. As here shown, the distributor block has a metallic sleeve 45 molded therein and provided with internal shoulders 46, 47 and 48. A solid metallic contact element 49 is slidably mounted in one end of the cylinder 45 with a portion 51 projecting therefrom and having a shoulder 52 adapted to engage the shoulder 46 of the sleeve to limit outward movement of the contact element. A second contact element 53 is provided in the other end of the sleeve 45 having resilient tongues 54 terminating in shoulders 55 adapted to engage shoulder 48 of the sleeve to limit outward movement thereof. A spring 56 is provided for yieldably pressing the contact elements outward.

In assembling this device, the contact element 49 is first inserted in the sleeve 45, followed by the spring 56. Tongues 54 of contact element 53 are then compressed and the contact element pushed in until the shoulders 55 spring out back of the shoulder 48 of the sleeve 45, whereupon the parts are held in operative position. When the distributor block is in position, the contact elements 49 and 53 are yieldably pressed by the spring 56 against the contact 43 of the distributor arm and the terminal 35 of the coil 32 respectively.

Figure 1:
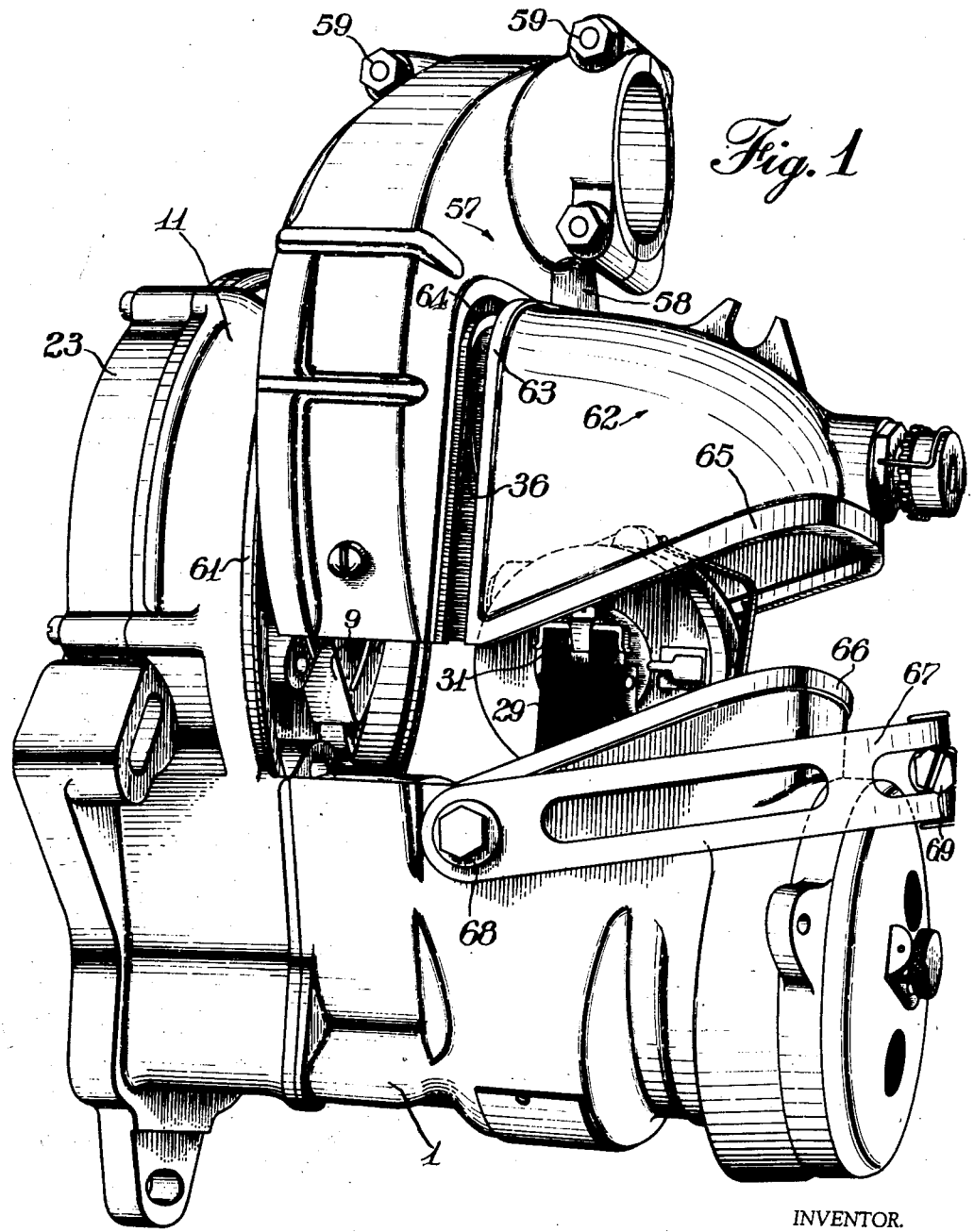
Fig. 1 is a perspective view of a magneto embodying a preferred form of the invention with certain parts thereof partly disassembled.

According to the present invention, a sectional casing element of non-magnetic metal is provided for the distributor block as best shown in Fig. 1. This casing element is composed of two halves 57 and 58 which may be clamped upon the distributor block as by means of bolts 59, and are formed to interfit with a flange 61 on the portion 11 of frame 1, whereby the distributor block with its casing section is removable as a unit from the magneto, but when in position closely interfits with the frame of the magneto. This casing section may be formed to lead the cables out vertically as shown in Fig. 1 or horizontally as shown in Fig. 2.

A casing section 62 (Fig. 1) of non-magnetic metal for the coil 32 is provided having a flange 63 arranged to fit in a groove 64 on the adjacent edge of the casing 57, 58 for the distributor block, and is provided with a second flange 65 arranged to interfit with an upwardly extending flange 66 of the frame 1. The casing section 62 is formed somewhat wedge-shaped, that is the angle between the flanges 63 and 65 is considerably less than a right angle, and the flange 66 of the frame is correspondingly inclined upward so that pressure applied downwardly on the casing section 62 causes it to wedge itself between the flange 65 of the frame and the casing elements 57, 58 for the distributor block.

Unitary retaining means for applying pressure to the casing element 62 is provided in the form of a clamping strap 67 pivotally anchored to the frame as shown at 68 and provided with a suitable tightening means indicated at 69.

It will be seen that there is here provided a completely radio-shielded magneto in which the transmission elements may run in oil in a separately sealed compartment, and the coil and distributor parts are readily accessible for observation or service. All that is necessary to secure access to the coil is to loosen the single fastening means 69 and swing the strap 67 out of the way, whereupon the casing section 62 is readily removed. The distributor block in its casing and with the output cables assembled may then be removed as a unit by simply sliding it upward from its seat on the frame. Reassembly is readily accomplished in the reverse order, and the parts are completely unified by the single detachable retaining means 67, 69.

In the operation of the device, rotation of the magnetic rotor 2 induces current in the primary of coil 32 which is controlled by the breaker mechanism 8 as actuated by the cam 7. The consequent secondary current emerging at the output terminal 35 of the coil is led through the conducting means 37 to the rotor arm 22 from whence it is led to the contacts 38 in sequence, and is conducted from thence by the cables 41 to the spark plugs of the engine for which the device furnishes the ignition. It will be understood that sufficient lubricant may be introduced in the chamber for the gearing 17, 19 to permit operation thereof over long periods of time without the necessity of service of any kind.

Although but one embodiment of the invention has been shown and described in detail, it will be understood that various changes may be made in the design and arrangements of the parts without departing from the spirit of the invention as defined in the claims appended hereto.

What is claimed is:

1. A magneto generator including a magnet rotor, a distributor rotor, gearing connecting said rotors, a distributor block, a coil, a metallic casing for said rotors, a casing section for the distributor block and a casing section for said coil, said sections so interfitting that one casing section acts as a retainer for the other parts of the casing.

2. A magneto generator including a magnet rotor, a distributor rotor, gearing connecting said rotors, a distributor block, a coil, a metallic casing for said rotors, a casing section for the distributor block and a casing section for said coil, said sections so interfitting with each other and with the casing for the rotors that one casing section acts as a retainer for the other parts of the casing, and unitary means for holding said casing section in assembled position.

3. A magneto generator including a magnet rotor, a distributor rotor, gearing connecting said rotors, a distributor block, a coil, a metallic casing for said rotors, a casing section for the distributor block and a wedge-shaped casing section for said coil, said sections so interfitting with each other and with the casing for the rotors that the casing section for the coil when in position locks the other parts of the casing in assembled relation.

4. A magneto generator including a magnet rotor, a distributor rotor, gearing connecting said rotors, a distributor block, a coil, a metallic casing for said rotors, a casing section for the distributor block and a wedge-shaped casing section for said coil, said sections so interfitting with each other and with the casing for the rotors that the casing section for the coil when assembled wedges the remaining parts of the casing in assembled position and cooperates therewith to form a complete enclosure and shield for the magneto.

5. In a magneto generator a magnet rotor, a distributor rotor, gearing connecting said rotors, a housing for said rotors and gearing including a chamber for the gearing and means to prevent the escape of lubricant from said chamber.

6. In a magneto generator a magnet rotor, a distributor rotor, gearing connecting said rotors, a housing for said rotors and gearing including a partition separating the gearing from said rotors, bearings in said partition for supporting said gearing and rotors, and means for preventing passage of lubricant through said partition.

7. In a magneto generator a frame having an opening defined by flanges formed to provide a seat for a casing element, a unitary distributor block and cable connector, a casing element surrounding said block, and means including a wedge-shaped casing section for locking the distributor casing unit in place on said seat.

8. In a magneto generator a frame having an opening defined by flanges formed to provide a seat for a casing element, a unitary distributor block and cable connector, a split casing surrounding said block and clamped thereon to form a unit adapted to be received by the seat on said frame, and a casing section formed to interfit with the frame and the distributor casing unit and wedge the distributor unit into its seat on the frame.

9. In a magneto generator a frame having an opening defined by flanges formed to provide a seat for a casing element, a generally circular unitary distributor block and cable connector, a casing unit surrounding the periphery of said block, and means including a wedge-shaped casing section for locking the distributor casing unit in place and completing the shielding of the magneto.

10. In a magneto generator a high tension coil, a distributor rotor, a unitary distributor and cable terminal block located between the coil and the rotor, a conductor mounted in the terminal block connecting the coil to the distributor rotor, and a set of contacts in the terminal block arranged to periodically receive current from the rotor, said block having means for admitting output cables through its periphery and anchoring and connecting them to the contacts.

11. In a magneto generator a high tension coil, a distributor rotor having a radial arm, a generally circular unitary distributor and cable terminal block located between the coil and the rotor, a conductor traversing the terminal block connecting the coil through the center of the block to the distributor arm, and a set of contacts in the terminal block arranged to periodically receive current from the rotor arm, said block having means for admitting output cables through its periphery and anchoring and connecting them to the contacts.

12. In a magneto generator a high tension coil, a distributor rotor, a generally circular unitary distributor and cable terminal block located therebetween, means for conducting high tension current from the coil through the center of the block to the distributor, and a set of contacts in the distributor block arranged to periodically receive current from the rotor, said block having means for admitting a group of output cables laterally through its periphery and anchoring and connecting them to the contacts, said conducting means being collapsible to permit lateral insertion of the block between the rotor and coil.

13. In a magneto generator, a frame of nonmagnetic metal, a magnetic rotor journalled therein, a distributor rotor journalled in said frame, means including gearing for driving the distributor rotor from the magnetic rotor, housing means of non-magnetic metal cooperating with the frame to provide an oil-tight chamber for the gearing, a distributor terminal block, a casing section for housing the same, a high tension coil, a casing section for housing said coil, means for conducting current from said coil through the distributor block to the distributor rotor, and means for preventing escape of lubricant from said chamber into said casing sections, said casing sections and said housing means cooperating with said frame to completely enclose and shield the elements of the magneto.

14. A magneto generator including a frame, a magnetic rotor, a distributor rotor mounted therein, gearing for driving the distributor rotor from the magnetic rotor, an oil-tight housing for enclosing the gearing, a coil, a distributor terminal block, and casing sections for the coil and block removable as units therewith, said frame, housing and casing sections so interfitting as to enclose and shield the elements of the magneto.

WALTER J. SPENGLER.